United States Patent
Chang

(10) Patent No.: US 11,128,217 B2
(45) Date of Patent: Sep. 21, 2021

(54) POWER MANAGEMENT SYSTEM UTILIZING BYPASS DEVICE

(71) Applicant: QISDA CORPORATION, Taoyuan (TW)

(72) Inventor: Chih-Ming Chang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 40 days.

(21) Appl. No.: 16/726,844

(22) Filed: Dec. 25, 2019

(65) Prior Publication Data

US 2020/0212802 A1 Jul. 2, 2020

(30) Foreign Application Priority Data

Dec. 27, 2018 (CN) .......................... 201811615156.5

(51) Int. Cl.
*H02M 3/158* (2006.01)
*H02M 1/00* (2006.01)
*H02M 1/38* (2007.01)

(52) U.S. Cl.
CPC .......... *H02M 3/158* (2013.01); *H02M 1/0045* (2021.05); *H02M 1/385* (2021.05)

(58) Field of Classification Search
CPC .... G06F 1/3203; G06F 1/3206; G06F 1/3212; G06F 1/3215; H02J 1/10; H02J 7/0016; H02J 7/0024; H02J 7/34; H02J 3/007; H02J 9/00; H02J 9/06; H02J 9/061; H02M 3/158; H02M 3/1584; H02M 2001/0045

See application file for complete search history.

(56) References Cited

U.S. PATENT DOCUMENTS

| | | | |
|---|---|---|---|
| 2005/0029872 A1* | 2/2005 | Ehrman | H02M 3/33538 307/11 |
| 2013/0009470 A1* | 1/2013 | Chuang | H02J 7/0063 307/31 |
| 2015/0214770 A1* | 7/2015 | Chen | H02J 2207/20 307/19 |
| 2019/0131810 A1* | 5/2019 | Lim | H02J 7/0029 |

\* cited by examiner

*Primary Examiner* — Alex Torres-Rivera

(57) ABSTRACT

A power management system includes a bypass device, a main boost converter and a linear regulator. The bypass device is coupled to a node, when a main input voltage exceeds a threshold voltage, the bypass device is used to output the main input voltage to the node, and when the main input voltage is less than the threshold voltage, the bypass device is disabled. The main boost converter is coupled to the node, when the main input voltage is less than the threshold voltage, the main boost converter is used to up-convert the main input voltage to the threshold voltage to output the threshold voltage to the node, and when the main input voltage exceeds than the threshold voltage, the main boost converter is disabled. The linear regulator is coupled to the node for down-converting the voltage at the node to provide a first voltage to a microprocessor.

14 Claims, 6 Drawing Sheets

POWER MANAGEMENT SYSTEM UTILIZING BYPASS DEVICE

CROSS REFERENCE TO RELATED APPLICATION

This non-provisional application claims priority of China patent application No. 201811615156.5, filed on 27 Dec., 2018, included herein by reference in its entirety.

BACKGROUND OF THE INVENTION

1. Field of the Invention

The invention relates to a power management system, and specifically, a power management system utilizing a bypass device.

2. Description of the Prior Art

In a toll road information system, every vehicle is equipped with an on-board unit (OBU) to collect toll information. The OBU contains a plurality of wireless communication devices including the third generation (3G)/the fourth generation (4G) mobile communication devices, Wi-Fi/Bluetooth devices, dedicated short distance communication-5.9G (DSRC-5.9G) devices, dedicated short distance communication-2.4G (DSRC-2.4G) devices, frequency modulation-radio data system (RM-RDS) devices and near field communication (NFC) devices.

When power is unavailable to a vehicle, if an on-board unit is removed, the on-board unit has to be able to actively notify an administration unit of its removal. Therefore, the on-board unit is equipped with a built-in battery. Nevertheless, the battery is nonchargeable. An on-board unit must employ strict power management to achieve a standby function on an annual basis. Therefore, a power management system and a backup power management system are in need to handle power management of an on-board unit, extending a battery life of a built-in battery of the on-board unit.

SUMMARY OF THE INVENTION

According to one embodiment of the invention, a power management system includes a bypass device, a main boost converter and a linear regulator. The bypass device is coupled to a node, when a main input voltage exceeds a threshold voltage, the bypass device is used to output the main input voltage to the node, and when the main input voltage is less than the threshold voltage, the bypass device is disabled. The main boost converter is coupled to the node, when the main input voltage is less than the threshold voltage, the main boost converter is used to up-convert the main input voltage to the threshold voltage to output the threshold voltage to the node, and when the main input voltage exceeds than the threshold voltage, the main boost converter is disabled. The linear regulator is coupled to the node for down-converting the voltage at the node to provide a first voltage to a microprocessor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
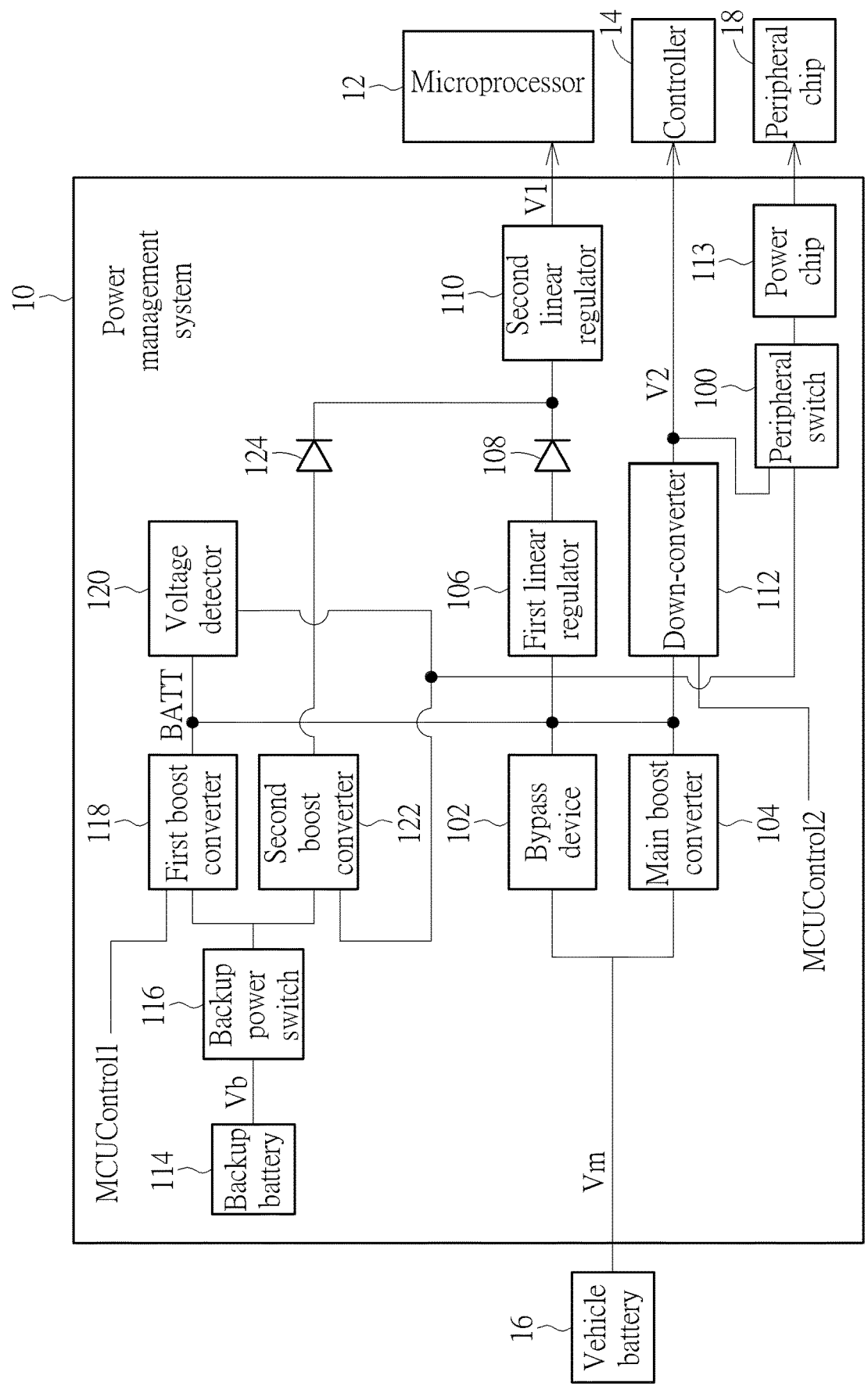
FIG. 1 is a schematic diagram of a power management system according to an embodiment of the invention.

FIG. 1 is a schematic diagram of a power management system 10 according to an embodiment of the invention. The power management system 10 is arranged on a vehicle and may be used in an on-board unit. The power management system 10 comprises a bypass device 102, a main boost converter 104, a first linear regulator 106, a first diode 108, a second linear regulator 110, a down-converter 112, a peripheral switch 100, a power chip 113, a backup battery 114, a backup power switch 116, a first boost converter 118, a voltage detector 120, a second boost converter 122 and a second diode 124. A vehicle battery 16 is coupled to the bypass device 102 and the main boost converter 104. The backup power switch 116 is coupled to the backup battery 114, the first boost converter 118 and the second boost converter 122. The bypass device 102, the main boost converter 104, the first linear regulator 106, the down-converter 112, the first boost converter 118 and the voltage detector 120 are coupled to a node BATT. The voltage detector 120 is further coupled to the second boost converter 122. The down-converter 122 is further sequentially coupled to the peripheral switch 100 and the power chip 113. The first diode 108 comprises an anode and a cathode. The anode of the first diode 108 is coupled to the first linear regulator 106. The cathode of the first diode 108 is coupled to a cathode of the second diode 124 and the second linear regulator 110. The first diode 124 comprises an anode and the cathode. The anode of the second diode 124 is coupled to the second boost converter 122. The second linear regulator 110 is coupled between the cathode of the first diode 108 and a microprocessor 12. The down-converter 112 is coupled to a controller 14. The power chip 113 is coupled to a peripheral chip 18.

Figure 2:
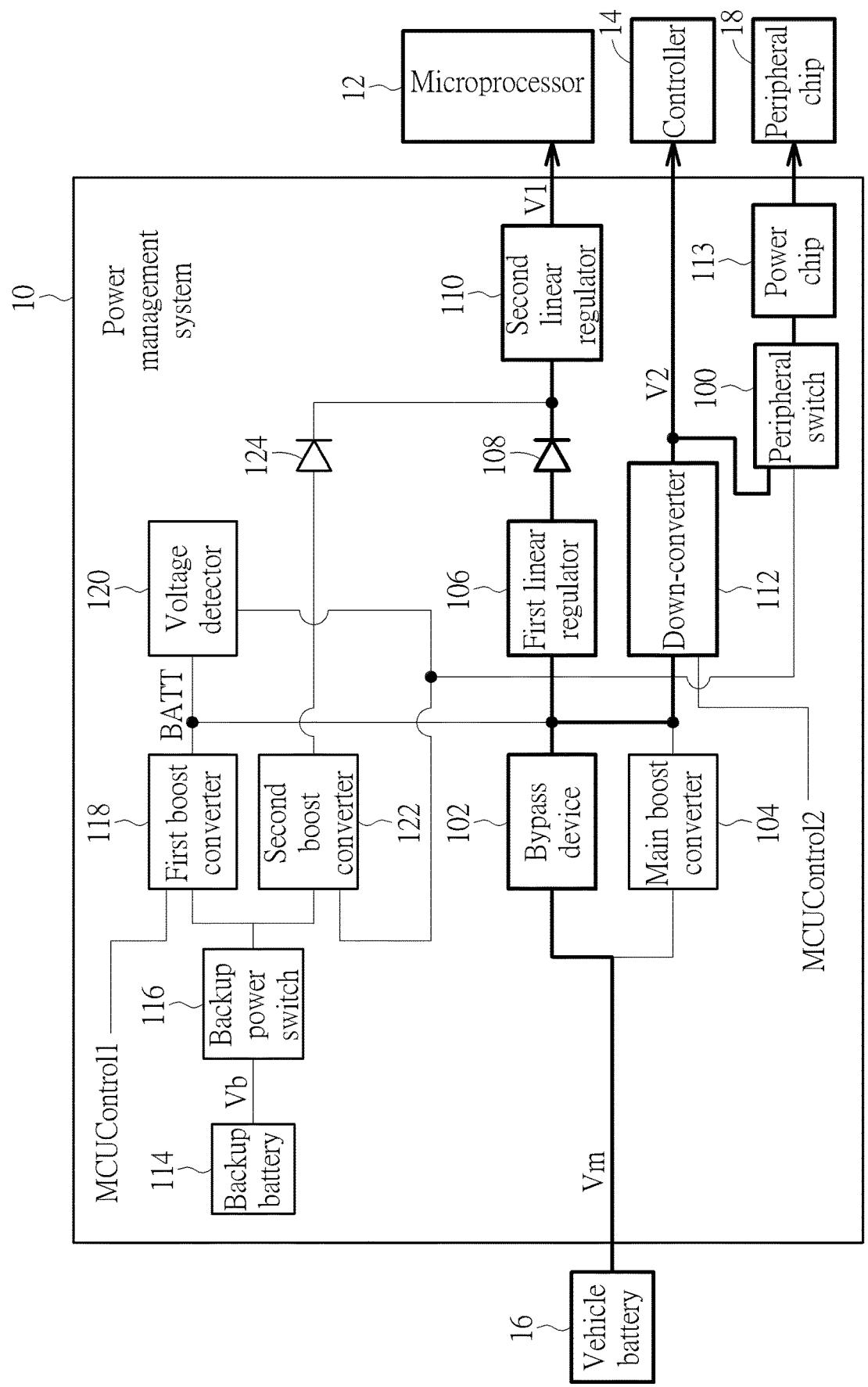
FIGS. 2 to 5 show schematic diagrams of four operation states of the power management system in FIG. 1.
Figure 3:
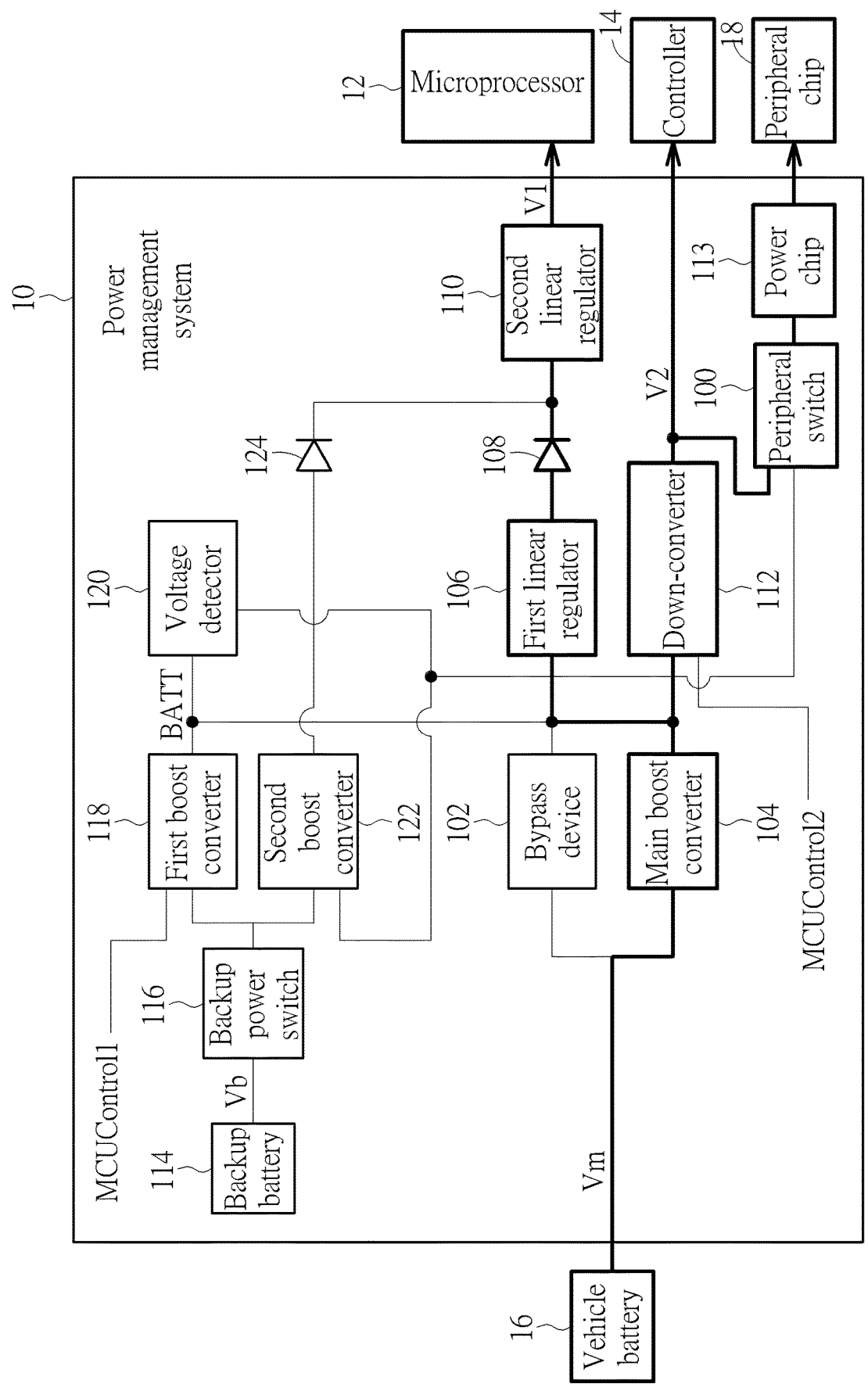
Figure 4:
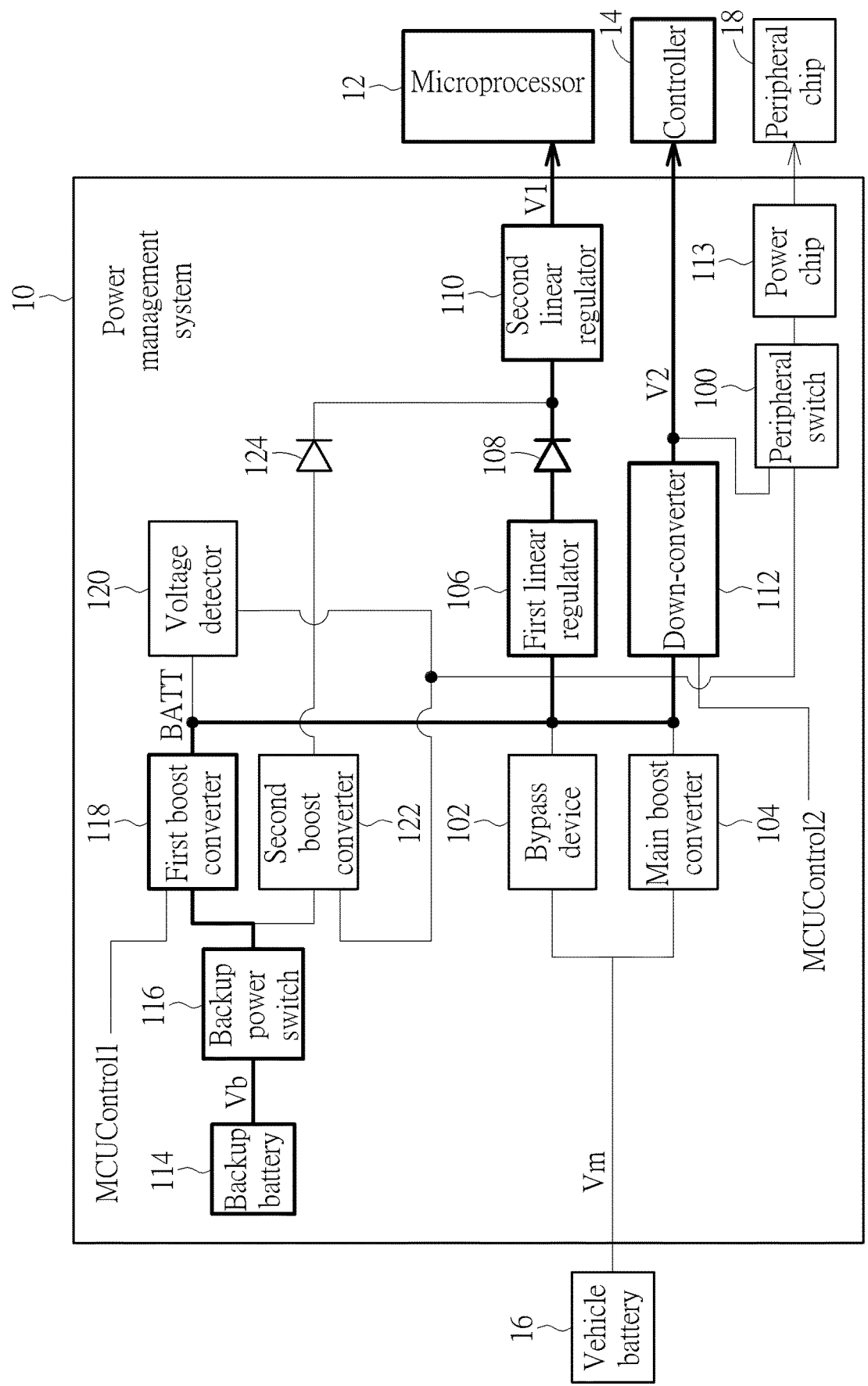
Figure 5:
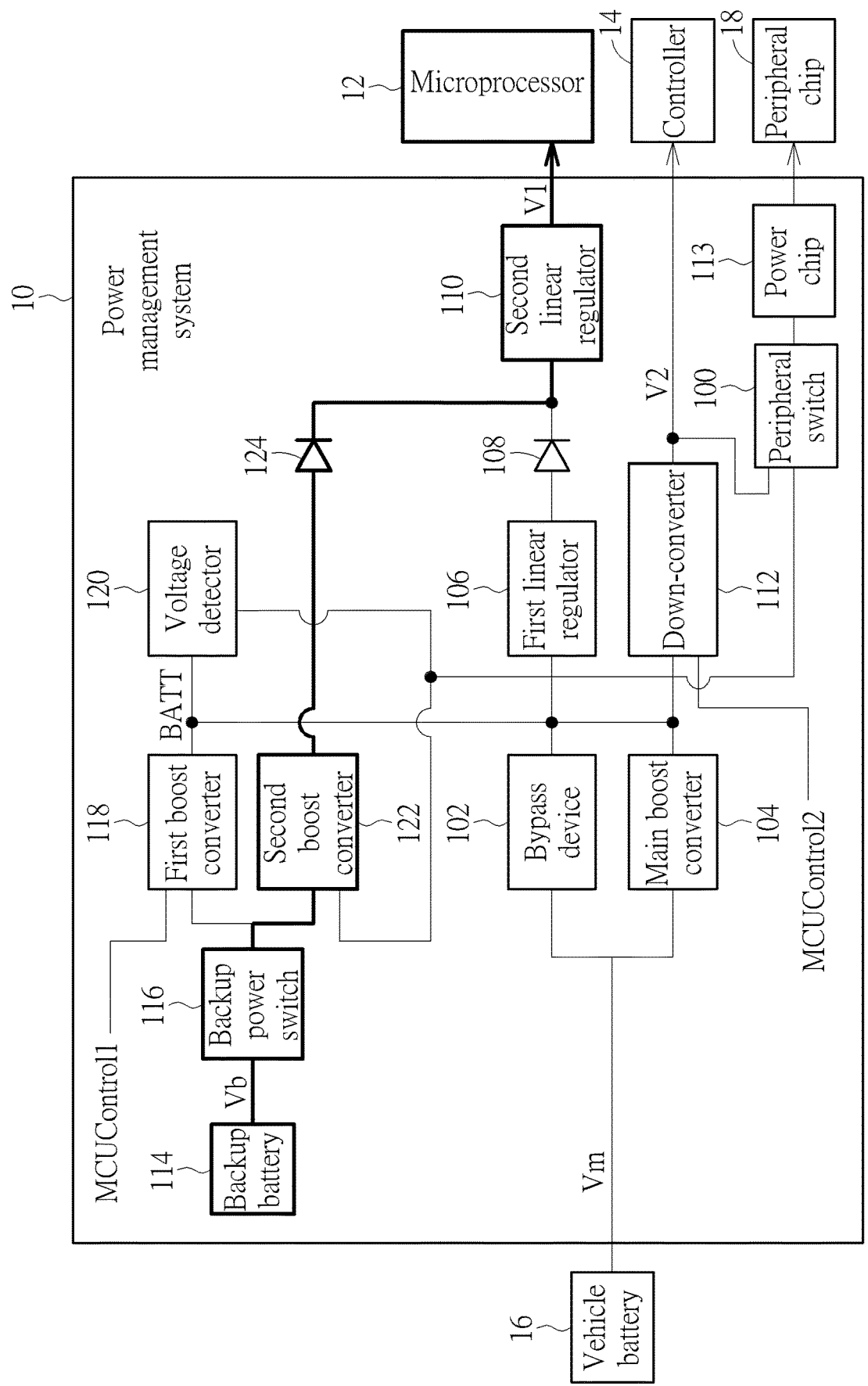

FIGS. 2 to 5 show schematic diagrams of four operation states of the power management system 10. FIG. 2 shows a schematic diagram of an operation state in which the power management system 10 supplies power from the vehicle battery 16 via the bypass device 102. FIG. 3 shows a schematic diagram of an operation state in which the power management system 10 supplies power from the vehicle battery 16 via the main boost converter 104. FIG. 4 shows a schematic diagram of an operation state in which the power management system 10 supplies power from the backup battery 114 via the first boost converter 118. FIG. 5 shows a schematic diagram of an operation state in which the power management system 10 supplies power from the backup battery 114 via the second boost converter 122. The voltage detector 120 may detect a voltage at the node BATT to enable the power management system 10 to determine a power supply status of the vehicle battery 16, and adjust the backup battery 114 according to the power supply status of the vehicle battery 16 and a data processing status of the controller 14 to supply power to the first boost converter 118 and the second boost converter 122, so as to extend a service life of the backup battery 114. When the power management system 10 is in operation, the backup power switch 116 may be closed. When the vehicle battery 16 supplies power to the power management system 10, the first boost converter 118 and the second boost converter 122 are disabled to prevent the backup battery 114 from supplying power to the power management system 10 via the backup power switch 116.

As shown in FIG. 2, when the bypass device 102 and/or the main boost converter 104 detects that a main input voltage Vm is greater than a threshold voltage Vth (e.g., 8.5V), the bypass device 102 may be automatically enabled and the main boost converter 104 may be automatically disabled. As a result, the bypass device 102 may transmit the main input voltage Vm (e.g., from 10V to 36V) from the vehicle battery 16 to the first linear regulator 106 and the down-converter 112 via the node BATT. The first linear regulator 106 may down-convert the main input voltage Vm to a first intermediate voltage (e.g., 3.5V). The first intermediate voltage is then down-converted by the first diode 108 to the second intermediate voltage (e.g., 3.3V). The second intermediate voltage is subsequently down-converted by the second linear regulator 110 to a first voltage V1 (e.g., 1.8V), so as to output the first voltage V1 to the microprocessor 12. The down-converter 112 may down-convert the main input voltage Vm to a second voltage V2 (e.g., 3.3V or 5V), so as to output the second voltage V2 to the controller 14 and the peripheral switch 100. When the voltage detector 120 detects that the voltage at the node BATT is greater than a first predetermined voltage Vthb1 (e.g., 7.7V), the peripheral switch 100 may be switched on, thus the peripheral switch 100 may transmit the supply voltage V2 to the power chip 113 to output a supply voltage to the peripheral chip 18 via the power chip 113.

As shown in FIG. 3, when the bypass device 102 and/or the main boost converter 104 detects that the main input voltage Vm is less than the threshold voltage Vth (e.g., 8.5V), the bypass device 102 may be automatically disabled and the main boost converter 104 may be automatically enabled. The main boost converter 104 may up-convert the main input voltage Vm (e.g., from 1.5V to 8.5V) from the vehicle battery 16 to the threshold voltage Vth. The first linear regulator 106 and the down-converter 112 may receive the threshold voltage Vth output by the main boost converter 104 via the node BATT. Later, the first linear regulator 106 may down-convert the threshold voltage Vth to the first intermediate voltage (e.g., 3.5V). The first intermediate voltage is then down-converted by the first diode 108 to the second intermediate voltage (e.g., 3.3V). The second intermediate voltage is subsequently down-converted by the second linear regulator 110 to the first voltage V1 (e.g., 1.8V), so as to output the first voltage V1 to the microprocessor 12. The down-converter 112 may down-convert the threshold voltage Vth to the second voltage V2 (e.g., 3.3V or 5V), so as to output the second voltage V2 to the controller 14 and the peripheral switch 100. When the voltage detector 120 detects that the voltage at the node BATT is greater than a first predetermined voltage Vthb1 (e.g., 7.7V), the peripheral switch 100 may be closed, thus the peripheral switch 100 may transmit the supply voltage V2 to the power chip 113 to output a supply voltage to the peripheral chip 18 via the power chip 113. When the main input voltage Vm is reduced to a lowest supply voltage Vmin (e.g., 1.5V), the main boost converter 104 may raise the main input voltage Vm to the threshold voltage Vth, preventing the power management system 10 from switching to the backup battery 144 for power supply in an event of a sudden voltage drop at the vehicle battery 16 resulting from starting an engine or a motor.

As shown in FIG. 4, when the voltage detector 120 detects that the voltage at the node BATT drops below the first predetermined voltage Vthb1 (e.g., 7.7V), the voltage detector 120 may enable the second boost converter 122 and open the peripheral switch 100, and the peripheral chip 18 not performing data storing (such as a global positioning system chip) may be disabled, and therefore, the vehicle battery 16 is determined as running out of power or being removed. When the bypass device 102 detects that the voltage at the node BATT drops below a second predetermined voltage Vthb2 (e.g., 6.8V), the first boost converter 118 may also be enabled, the second boost converter 122 may remain enabled to output a backup voltage Vb (e.g., 3V) from the backup battery 114 to the first boost converter 118 and the second boost converter 122 via the backup power switch 116, and the first boost converter 118 may up-convert the backup voltage Vb to the second predetermined voltage Vthb2. The first linear regulator 106 may down-convert the second predetermined voltage Vthb2 to the first intermediate voltage (e.g., 3.5V). The first intermediate voltage is then down-converted by the first diode 108 to the second intermediate voltage (e.g., 3.3V). The second intermediate voltage is subsequently down-converted by the second linear regulator 110 to the first voltage V1 (e.g., 1.8V), so as to output the first voltage V1 to the microprocessor 12. When the backup voltage Vb is output to the second boost converter 122, the second boost converter 122 may up-convert the backup voltage Vb to the second intermediate voltage (e.g., 3.3V). Since the second intermediate voltage output by the first diode 108 is the same as the second intermediate voltage output by the second boost converter 122, the second linear regulator 110 may down-convert the second intermediate voltage to the first voltage V1. The down-converter 112 may down-convert the second predetermined voltage Vthb2 to a second voltage V2 (e.g., 3.3V or 5V), so as to output the second voltage V2 to the controller 14, and enable the controller 14 to store data.

As shown in FIG. 5, when the vehicle battery 16 substantially runs out of power or is removed, and the controller 14 has completed storing data, the microprocessor 12 may transmit a signal MCUControl1 to disable the first boost converter 118 and transmit a signal MCUControl2 to disable the down-converter 112 while keeping the second boost converter 122 enabled. Meanwhile, the backup voltage Vb is output via the backup power switch 116 to the second boost converter 122. The second boost converter 122 may up-convert the backup voltage Vb to the second intermediate voltage (e.g., 3.3V). The second intermediate voltage may be down-converted by the second diode 124 to a third intermediate voltage (e.g., 3.1V). The second linear regulator 110 may further down-convert the third intermediate voltage to the first voltage V1 to provide the same to the microprocessor 12, enabling the microprocessor 12 of the power management system 10 to operate in a reduced power environment, while being able to wake up other devices upon the vehicle battery 16 resuming power supplies once again. When the power management system 10 operates in the reduced power environment, devices other than the microprocessor 12, such as a gyroscope, an accelerator, a Hall effect sensor, a security chip and/or Bluetooth chip may continue to receive power via the second boost converter 122.

Rather than up-converting the backup voltage Vb to a high voltage level such as the second predetermined voltage Vthb2 (e.g., 6.8V) by the first boost converter 118, the second boost converter 122 up-converts the backup voltage Vb directly to the second intermediate voltage (e.g., 3.3V), and thus the power management system 10 may effectively save the power by enabling the second boost converter 122 without enabling the first boost converter 118.

Figure 6:
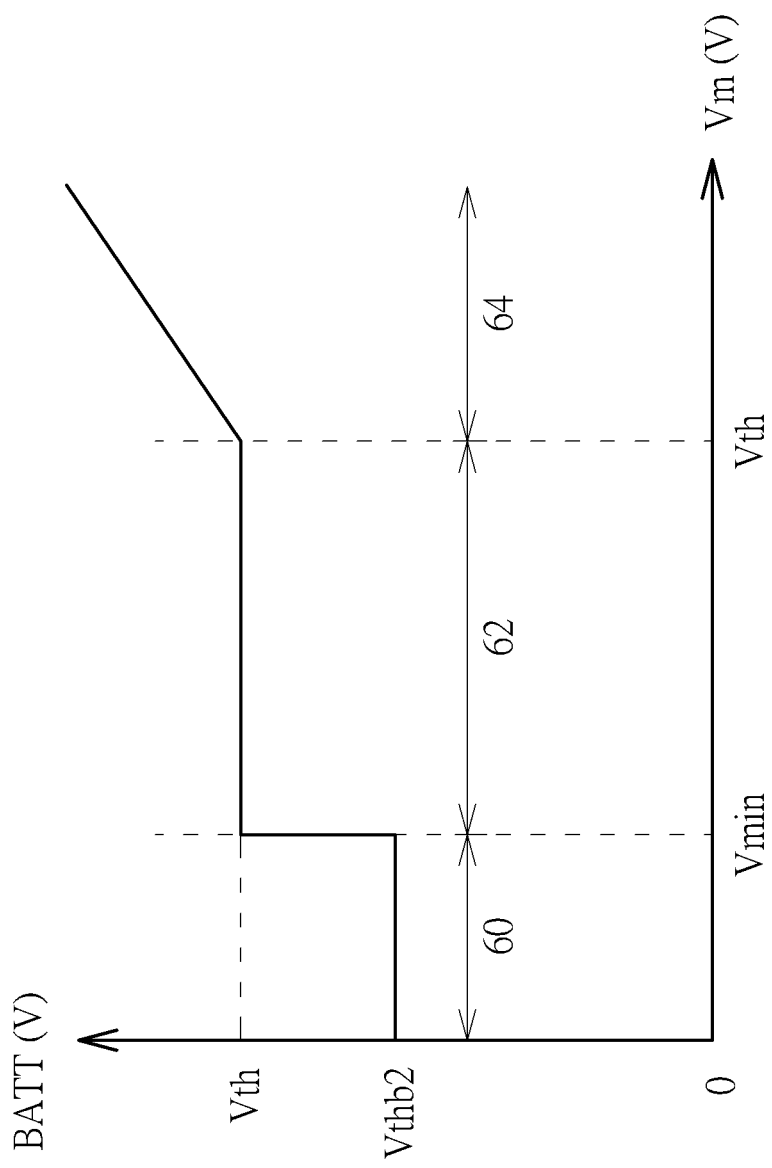
FIG. 6 shows a relationship of the main input voltage and the voltage at the node of the power management system in FIGS. 2 to 5.

FIG. 6 shows a relationship of the main input voltage Vm and the voltage at the node BATT of the power management system 10, where the horizontal axis represents the main input voltage Vm and the vertical axis represents the voltage at the node BATT. At Stage 64, the main input voltage Vm is greater than the threshold voltage Vth (e.g., 8.5V), the bypass device 102 directly outputs the main input voltage Vm to the node BATT, and thus the voltage at the node BATT and the main input voltage Vm are the same. At Stage 62, the main input voltage Vm is less than the threshold voltage Vth and greater than the minimum supply voltage Vmin (e.g., 1.5V), the main boost converter 104 up-converts the main input voltage Vm to maintain the voltage of the node BATT at the threshold voltage Vth. At Stage 60, the vehicle battery 16 substantially runs out of power or is removed, the first boost converter 118 up-converts the backup voltage Vb to the second predetermined voltage Vthb2 (e.g., 6.8V).

The embodiments in FIGS. 2 to 5 supply power from the vehicle battery 16 or the backup battery 114 according to the power supply status of the vehicle battery 16. When a voltage drop occurs at the vehicle battery 16, the power management system 10 continues to receive power from the vehicle battery 16 so long as the voltage provided by the vehicle battery 16 remains above the minimum supply voltage Vmin, without switching to the backup battery 14 for power supply upon a sudden voltage drop at the vehicle battery 16. When the vehicle battery 16 substantially runs out of power or is removed, and the controller 14 has completed storing data, the second boost converter 122 is selected to supply power at a lower output voltage, thereby extending a battery life of the backup battery 114.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power management system comprising:
    a bypass device, coupled to a node, and configured to output a main input voltage to the node when the main input voltage is greater than a threshold voltage, and be disabled when the main input voltage is less than the threshold voltage;
    a main boost converter, coupled to the node, and configured to up-convert the main input voltage to the threshold voltage when the main input voltage is less than the threshold voltage so as to output the threshold voltage to the node, and be disabled when the main input voltage is greater than the threshold voltage;
    a first linear regulator, coupled to the node, and configured to down-convert a voltage at the node to provide a first voltage to a microprocessor;
    a first diode, comprising:
        an anode, coupled to the first linear regulator; and
        a cathode;
    a second linear regulator, coupled between the cathode and the microprocessor;
    a backup battery, configured to provide a backup voltage;
    a backup power switch, coupled to the backup battery;
    a second boost converter, coupled to the backup power switch, and configured to up-convert the backup voltage when the voltage at the node is less than a first predetermined voltage; and
    a second diode, comprising:
        an anode, coupled to the second boost converter; and
        a cathode, coupled to the cathode of the first diode.

2. The power management system of claim 1, further comprising a down-converter, coupled to the node, and configured to down-convert the voltage at the node to provide a second voltage to the microprocessor.

3. The power management system of claim 1, wherein the first predetermined voltage is less than the threshold voltage.

4. The power management system of claim 3, further comprising a voltage detector, coupled to the node, a peripheral switch and the second boost converter, and configured to control the peripheral switch and the second boost converter according to the voltage at the node.

5. The power management system of claim 4, wherein: when the voltage detector detects that the voltage at the node is greater than the first predetermined voltage, the peripheral switch are configured to be switched on.

6. The power management system of claim 4, wherein: when the voltage detector detects that the voltage at the node is less than the first predetermined voltage, the second boost converter are configured to be enabled and the peripheral switch are configured to be switched off.

7. The power management system of claim 4, further comprising a power chip, coupled to the peripheral switch, and configured to receive the second voltage from the peripheral switch, and output a supply voltage to a peripheral chip.

8. The power management system of claim 4, further comprising a first boost converter, coupled between the node and the backup power switch, and configured to up-convert the backup voltage to a second predetermined voltage when a controller is storing data and the voltage detector detects that the voltage at the node is less than the second predetermined voltage, so as to output the second predetermined voltage to the node.

9. The power management system of claim 8, wherein when the controller completes storing the data, the first boost converter is disabled, and the second boost converter remains enabled.

10. The power management system of claim 8, wherein when the controller completes storing the data, the microcontroller is configured to transmit a first control signal to disable the first boost converter.

11. The power management system of claim 8, wherein when the controller completes storing the data, the microcontroller is configured to transmit a second control signal to disable the down-converter.

12. The power management system of claim 8, wherein the second predetermined voltage is less than the first predetermined voltage.

13. The power management system of claim 12, wherein when the controller completes storing the data, the first boost converter is disabled, and the second boost converter remains enabled.

14. The power management system of claim 1, wherein the bypass device and the first linear regulator are coupled to a vehicle battery.

* * * * *